United States Patent
Nayyar et al.

(10) Patent No.: US 11,588,567 B2
(45) Date of Patent: Feb. 21, 2023

(54) SYNCHRONIZING VEHICLE DEVICES OVER A CONTROLLER AREA NETWORK

(71) Applicant: Texas Instruments Incorporated, Dallas, TX (US)

(72) Inventors: Jasbir Singh Nayyar, Khanna (IN); Brian Paul Ginsburg, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 509 days.

(21) Appl. No.: 15/368,563

(22) Filed: Dec. 2, 2016

(65) Prior Publication Data

US 2018/0159647 A1    Jun. 7, 2018

(51) Int. Cl.
*H04J 3/06* (2006.01)
*H04L 12/40* (2006.01)
(Continued)

(52) U.S. Cl.
CPC ........... *H04J 3/0638* (2013.01); *B60W 30/00* (2013.01); *G01S 7/003* (2013.01); *G01S 7/35* (2013.01); *G01S 13/343* (2013.01); *G01S 13/87* (2013.01); *G01S 13/931* (2013.01); *G06F 13/42* (2013.01); *H04L 12/40* (2013.01); *G01S 2013/0254* (2013.01); *G01S 2013/93271* (2020.01); *G01S 2013/93272* (2020.01); *G01S 2013/93274* (2020.01); *G08G 1/166* (2013.01);
(Continued)

(58) Field of Classification Search
None
See application file for complete search history.

(56) References Cited

U.S. PATENT DOCUMENTS

| 4,633,253 A * | 12/1986 | Stove | G01S 13/536 342/128 |
| 6,111,888 A * | 8/2000 | Green | H04J 3/0652 370/447 |

(Continued)

FOREIGN PATENT DOCUMENTS

EP    2876460 A1 *  5/2015
WO    WO2014086647 A1  12/2014

OTHER PUBLICATIONS

Steve Corrigan, "Introduction to the Controller Area Network (CAN)", SLOA101A, Application Report, Texas Instruments, Aug. 2002, Revised Jul. 2008, pp. 1-15.

(Continued)

*Primary Examiner* — Noel R Beharry
*Assistant Examiner* — Rodrick Mak
(74) *Attorney, Agent, or Firm* — Michael Gabrik; Frank Cimino (57) ABSTRACT

A method for synchronizing devices in a vehicle may make use of the Controller Area Network (CAN) communication bus. A bus interface of each of two or more devices coupled to the bus may be configured to accept a same message broadcast via the communication bus, in which the message has a specific message identification (ID) header. A message may be received from the communication bus that has the specific message ID simultaneously by each of the two or more devices. Operation of the two or more devices may be synchronized by triggering a task on each of the two or more devices in response to receiving the message having the specific message ID.

20 Claims, 6 Drawing Sheets

FMCW RADAR SIGNAL (51) Int. Cl.
*B60W 30/00* (2006.01)
*G06F 13/42* (2006.01)
*G01S 7/00* (2006.01)
*G01S 13/34* (2006.01)
*G01S 7/35* (2006.01)
*G01S 13/87* (2006.01)
*G01S 13/931* (2020.01)
*G08G 1/16* (2006.01)
*G01S 13/02* (2006.01)

(52) U.S. Cl.
CPC ............... *H04L 2012/40215* (2013.01); *H04L 2012/40273* (2013.01)

(56) References Cited

U.S. PATENT DOCUMENTS

| | | | |
|---|---|---|---|
| 6,255,984 B1 | 7/2001 | Kreppold et al. | |
| 6,760,677 B2* | 7/2004 | Tanizume | H04L 12/66 |
| | | | 702/89 |
| 8,195,836 B2* | 6/2012 | Lee | H04L 12/2856 |
| | | | 709/224 |
| 9,516,595 B2* | 12/2016 | Abraham | H04W 52/0225 |
| 9,855,894 B1* | 1/2018 | Khorasani | B60R 1/00 |
| 2002/0027522 A1* | 3/2002 | Tullsson | G01S 7/023 |
| | | | 342/196 |
| 2004/0177285 A1 | 9/2004 | Klotz et al. | |
| 2008/0150532 A1* | 6/2008 | Slavin | G01R 33/50 |
| | | | 324/318 |
| 2012/0062743 A1* | 3/2012 | Lynam | B60Q 9/005 |
| | | | 348/148 |
| 2012/0235857 A1* | 9/2012 | Kim | G01S 13/345 |
| | | | 342/134 |
| 2013/0204472 A1* | 8/2013 | Pfefferl | B60L 58/12 |
| | | | 701/22 |
| 2014/0244125 A1* | 8/2014 | Dorum | G01C 21/32 |
| | | | 701/70 |
| 2015/0063371 A1* | 3/2015 | Horvath | H04L 47/826 |
| | | | 370/461 |
| 2015/0168555 A1* | 6/2015 | Herschbach | G01S 17/48 |
| | | | 356/5.01 |
| 2016/0025844 A1 | 1/2016 | Mckitterick et al. | |
| 2016/0164287 A1* | 6/2016 | Bernheim | H02J 3/00 |
| | | | 700/286 |
| 2016/0205194 A1* | 7/2016 | Kishikawa | H04L 9/3242 |
| | | | 726/1 |
| 2017/0150361 A1* | 5/2017 | Paryani | H04W 12/08 |
| 2017/0253172 A1* | 9/2017 | Canon | B60Q 1/04 |
| 2017/0317812 A1* | 11/2017 | Leng | H04L 7/0037 |
| 2018/0284267 A1* | 10/2018 | Maisel | G01S 7/003 |
| 2018/0351250 A1* | 12/2018 | Achour | G01S 7/03 |

OTHER PUBLICATIONS

Vikram Appia et al., "Surround View Camera System for ADAS on TI's TDAx SoCs", SPRY270A, Texas Instruments, Oct. 2015, pp. 1-18.
Hannes Estl, "Paving the Way to Self-Driving Cars with Advanced Driver Assistance Systems", SSZY019, Texas Instruments, Aug. 2015, pp. 1-9.
Roman Staszewski and Hannes Estl, "Making Cars Safer Through Technology Innovation", SSZY009, White Paper, Texas Instruments, Oct. 2013, pp. 1-8.
International Search Report and Written Opinion, PCT/US2017/064479, dated Mar. 22, 2018 (8 pages).

* cited by examiner

FMCW RADAR SIGNAL

SYNCHRONIZING VEHICLE DEVICES OVER A CONTROLLER AREA NETWORK

FIELD OF THE INVENTION

This invention generally relates to vehicular radar systems, and in particular to the use of a controller area network to synchronize vehicle radar devices.

BACKGROUND OF THE INVENTION

A new class of safety systems, referred to as advanced driver assistance systems (ADAS), has been introduced into automobiles to reduce human operation error. The proliferation of such assistance systems, which may provide functionality such as rear-view facing cameras, electronic stability control, and vision-based pedestrian detection systems, has been enabled in part by improvements in microcontroller and sensor technologies. These systems may be enabled by smart sensors based on millimeter-wave automotive radars. Enhanced embedded radar-based solutions are enabling complementary safety features for ADAS designers. See, for example, "Making Cars Safer Through Technology Innovation," October 2013.

In an automotive radar system, one or more radar sensors may be used to detect obstacles around the vehicle and the speeds of the detected objects relative to the vehicle. A processing unit in the radar system may determine the appropriate action needed, e.g., to avoid a collision or to reduce collateral damage, based on signals generated by the radar sensors. Current automotive radar systems are capable of detecting objects and obstacles around a vehicle, the position of any detected objects and obstacles relative to the vehicle, and the speed of any detected objects and obstacles relative to the vehicle. Via the processing unit, the radar system may, for example, alert the vehicle driver about potential danger, prevent a collision by controlling the vehicle in a dangerous situation, take over partial control of the vehicle, or assist the driver with parking the vehicle.

Currently, an integrated circuit (IC) containing a radar transceiver may be placed at each location in a vehicle where a radar signal is needed. For example, three ICs may be located on the front of a vehicle (middle and both corners) to provide forward looking coverage. Additional ICs may be deployed on the sides and rear of the vehicle.

The Controller Area Network (CAN) is an International Standardization Organization (ISO) defined serial communications bus originally developed for the automotive industry to replace the complex wiring harness with a two-wire bus. As an alternative to conventional multi-wire looms, CAN Bus allows various electronic components such as electronic control units, microcontrollers, devices, sensors, actuators and other electronic components throughout the vehicle to communicate on a single or dual-wire network data bus at data rates up to 1 Mb/s.

BRIEF DESCRIPTION OF THE DRAWINGS

Particular embodiments in accordance with the invention will now be described, by way of example only, and with reference to the accompanying drawings.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

With the advancement in radar technology more and more high end automotive applications are being created; surround view is one of them. The automotive surround view camera system is an emerging automotive ADAS (Advanced Driver Assistance System) technology that assists the driver in parking the vehicle safely by allowing him/her to see a top-down view of the 360 degree surroundings of the vehicle. Such a system normally consists of four to six wide-angle (fish-eye lens) cameras mounted around the vehicle, each facing a different direction. From these camera inputs, a composite view of the surroundings of the vehicle is synthesized and shown to the driver in real-time during parking. Surround view is described in detail in "Surround view camera system for ADAS on TI's TDAx SoCs," October 2015, Vikram Appla et al, which is incorporated by reference herein.

Object detection by radar may be used to determine distance from the vehicle to various nearby objects. This information may be merged with the surround view camera images to further improve the accuracy and safety of ADAS. To take advantage of high end data blending algorithms and better interference mitigation techniques, the operation of the radar sensors fitted around the vehicle may need to be synchronized within a couple of microseconds.

Synchronizing the radar sensors fitted across the vehicle body could be done with additional cable and an IO (input/output) interface on each radar device; however, adding a special purpose wiring harness to a vehicle may add significant expense.

A system will now be disclosed that uses an existing CAN interface to synchronize the radar sensors. The CAN bus is a typical car communication interface that may be used to share an object list determined by each radar module with a centralized CPU (central processing unit). With a minor update in the interface design on a radar sensor module, the existing CAN Car communication interface may be used to synchronize the surround view radar sensors.

Figure 1:
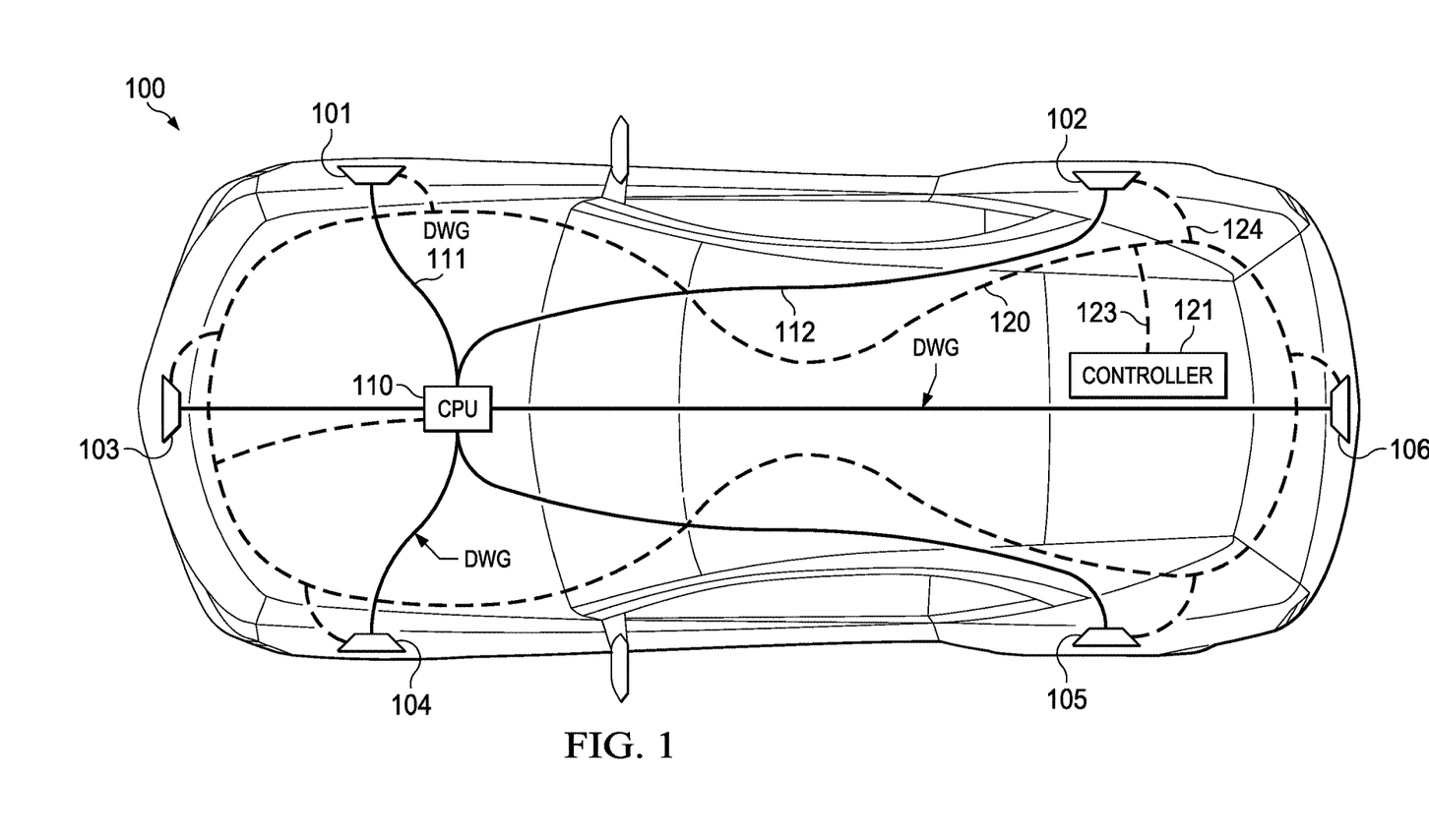
FIG. 1 is a top view of an example vehicle that includes radar based ADAS along with a CAN bus.

FIG. 1 is a top view of an example vehicle 100 that includes radar based ADAS along with a CAN bus 120. Vehicle 100 represents an automobile, however, other embodiments of this disclosure may be implemented on other types of vehicles, such as: trucks, trains, planes, drones, etc. and used to assist or fully control operation of the vehicle. In this example, a set of radar modules 101-106 are deployed around the vehicle and coupled to a processing unit 110. The term "CPU" (central processing unit) may be used to refer to processing unit 110, however, processing unit 110 may be distributed among several modules within vehicle 100. Processing unit 110 may include multiple processors, including signal processors, graphics processors, object tracking processors, etc. While six radar modules are illustrated here, other embodiments may include fewer or more radar modules. Other sensors may also be deployed around the vehicle to provide data to CPU 110, such as video cameras (color, monochrome, stereo, infrared, etc), ultra-sound, LIDAR (light detection and ranging), satellite communications, radio communications with nearby vehicles and terrestrial installations, etc. to provide information for positioning, localization, highway conditions, and other information.

In this example, high speed SerDes (serializer-deserializer) links such as links 111, 112 may be used to couple each radar module 101-106 to CPU 110 in order to transfer image data to CPU 110 from each radar module 101-106.

In this example, a single CAN bus 120 is routed throughout vehicle 100. Various stubs, such as 123, 124 may be dropped from bus 120 to connected to individual modules, such as radar units 101-106, controller 121, and CPU 110. Controller 121 may be part of the vehicle engine and/or body control system, for example. Many other control modules of various sorts that control the engine, suspension, climate control system, etc of vehicle 100 may be similarly connected to CAN 110. CPU 110 may send control commands to radar modules 101-106 using CAN 110, for example.

The CAN bus was developed by BOSCH as a multimaster, message broadcast system that specifies a maximum signaling rate of 1 megabit per second (bps). Unlike a traditional network such as USB (universal serial bus) or Ethernet, CAN does not send large blocks of data point-to-point from node A to node B under the supervision of a central bus master. In a CAN network, many short messages like temperature or RPM are broadcast to the entire network, which provides for data consistency in every node of the system.

The CAN bus was developed to replace the complex wiring harness with a two-wire bus. The specification calls for high immunity to electrical interference and the ability to self-diagnose and repair data errors. These features have led to CAN's popularity in a variety of industries including building automation, medical, and manufacturing.

The CAN communications protocol, ISO-11898: 2003, describes how information is passed between devices on a network and conforms to the Open Systems Interconnection (OSI) model that is defined in terms of layers. Actual communication between devices connected by the physical medium is defined by the physical layer of the model. The ISO 11898 architecture defines the lowest two layers of the seven layer OSI/ISO model as the data-link layer and physical layer arbitration on message priority (CSMA/CD+ AMP). CSMA means that each node on a bus must wait for a prescribed period of inactivity before attempting to send a message. CD+AMP means that collisions are resolved through a bit-wise arbitration, based on a preprogrammed priority of each message in the identifier field of a message. The higher priority identifier always wins bus access. That is, the last logic-high in the identifier keeps on transmitting because it is the highest priority. Since every node on a bus takes part in writing every bit "as it is being written," an arbitrating node knows if it placed the logic-high bit on the bus.

The ISO-11898:2003 Standard, with the standard 11-bit identifier, provides for signaling rates from 125 kbps to 1 Mbps. The standard was later amended with the "extended" 29-bit identifier. The standard 11-bit identifier field provides for $2^{11}$, or 2048 different message identifiers, whereas the extended 29-bit identifier provides for $2^{29}$, or 537 million identifiers. The CAN is well known and currently implemented in millions of vehicles. A more detailed overview is provided in "Introduction to the Controller Area Network (CAN), Steve Corrigan, revised July 2008, which is incorporated by reference herein. A complete set of the latest version of the ISO-11898 standard is available from the ISO (International Organization for Standards).

Processing system 110 may be based on SoC (system on a chip) devices such as those available from Texas Instruments Incorporated (TI), such as the TDA3x and TDA3x family of devices that may be augmented to include embodiments of the techniques disclosed herein. TI has fully integrated a set of peripherals into the TDAxx solution to simplify design and minimize space, thus facilitating sensor fusion. Communication interfaces, especially for camera and radar based systems like surround view and back-up camera, may benefit from TI's latest generation FPD-Link III SerDes family, which helps reduce the effort to connect remote ADAS satellites to central processing modules using a single coaxial cable. Reduced wiring effort and smaller modules due to smaller connectors and highly integrated components help ensure that the ever growing number of sensor modules for ADAS is not burdening new cars with high extra cost and weight. See, for example, "Paving the way to self-driving cars with advanced driver assistance systems," Hannes Estl, August, 2015.

While an automobile 100 is illustrated herein, other embodiments may be placed in other types of vehicles, such as trucks, trains, planes, drones, etc. and used to assist or fully control operation of the vehicle.

Figure 2:
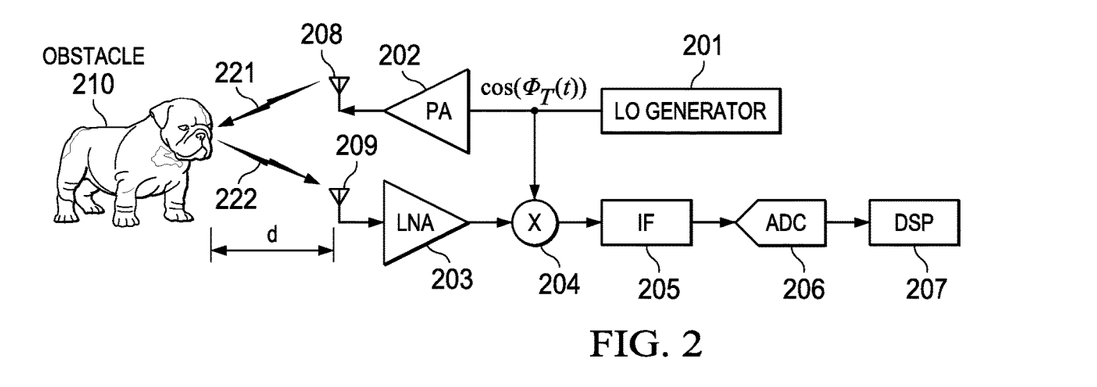
FIG. 2 is a block diagram illustrating the basic operation of object detection by radar.
Figure 3:
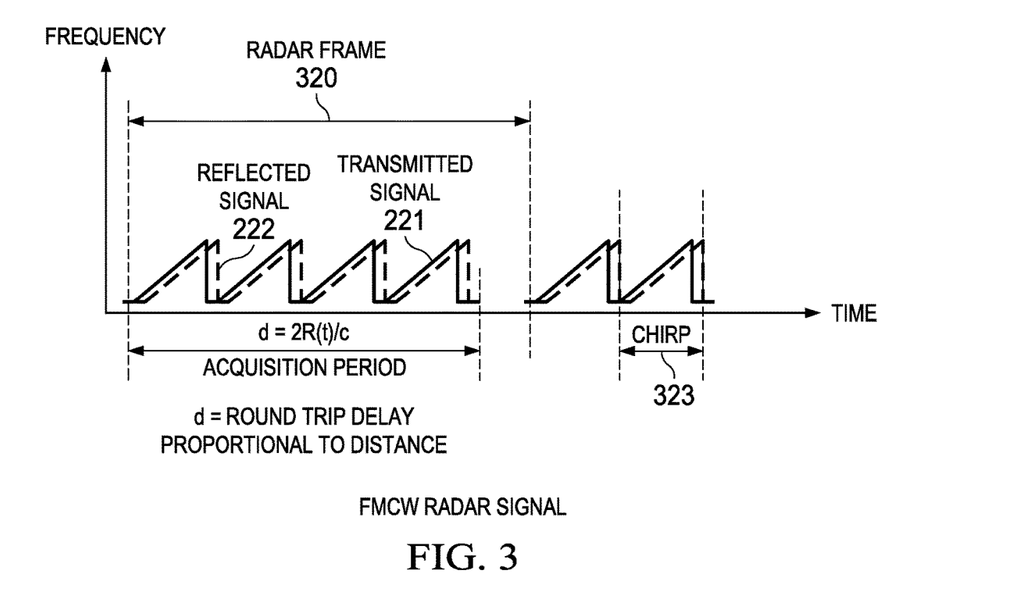
FIG. 3 is a plot illustrating operation of the radar detector of FIG. 2.

FIG. 2 is a block diagram illustrating the basic operation of object detection by a radar module, such as any of radar modules 101-106, referring to FIG. 1. FIG. 3 is a plot illustrating operation of the radar detector of FIG. 2. Radar data processing is typically done frame by frame, as illustrated by frame 320 in FIG. 3. Multiple Frequency Modulated continuous saw-tooth waves (FMCW) may be produced by generator 201 and transmitted one after the other in one frame by power amplifier 202 via transmitter antenna 208 to form radio signal 221

A reflected signal 222 from an obstacle 210 may be received by a low noise amplifier 204 via receiver antenna 209. The received signal may be mixed with the transmitted signal by mixer 204 to generate an intermediate frequency (IF) which is proportional to a distance d between the object and the radar module.

A maximum IF bandwidth for IF amplifier 205 is dictated by the ramp slope and maximum range required to be detected by radar. The amplified IF may then be converted to the digital domain by analog to digital converter (ADC) 206. A first dimension FFT (Fast Fourier Transform), referred to as the range FFT, may be performed by digital signal processor (DSP) 207 across one chirp 323 (FIG. 3) of the IF samples to obtain the range/distance.

Similarly, a second and a third dimension FFTs may be computed across all the chirps within a frame and across all the receiver (RX) and transmitter (Tx) antennas to get velocity/Doppler and angle. While only a single TX antenna 208 and a single RX antenna 209 are illustrated here for simplicity, there are typically multiple TX and RX antennae in each radar module.

As mentioned above, with advancements in radar technology, more and more high end automotive applications are being developed, such as a "Surround View Radar System." A surround view system enhances the performance (better accuracy, detection) of the system by taking advantage of data blending from multiple sensors, such as cameras and radar. High end data blending algorithms require the radar sensors fitted around car to be synchronized with a minimum skew as possible.

Figure 4:
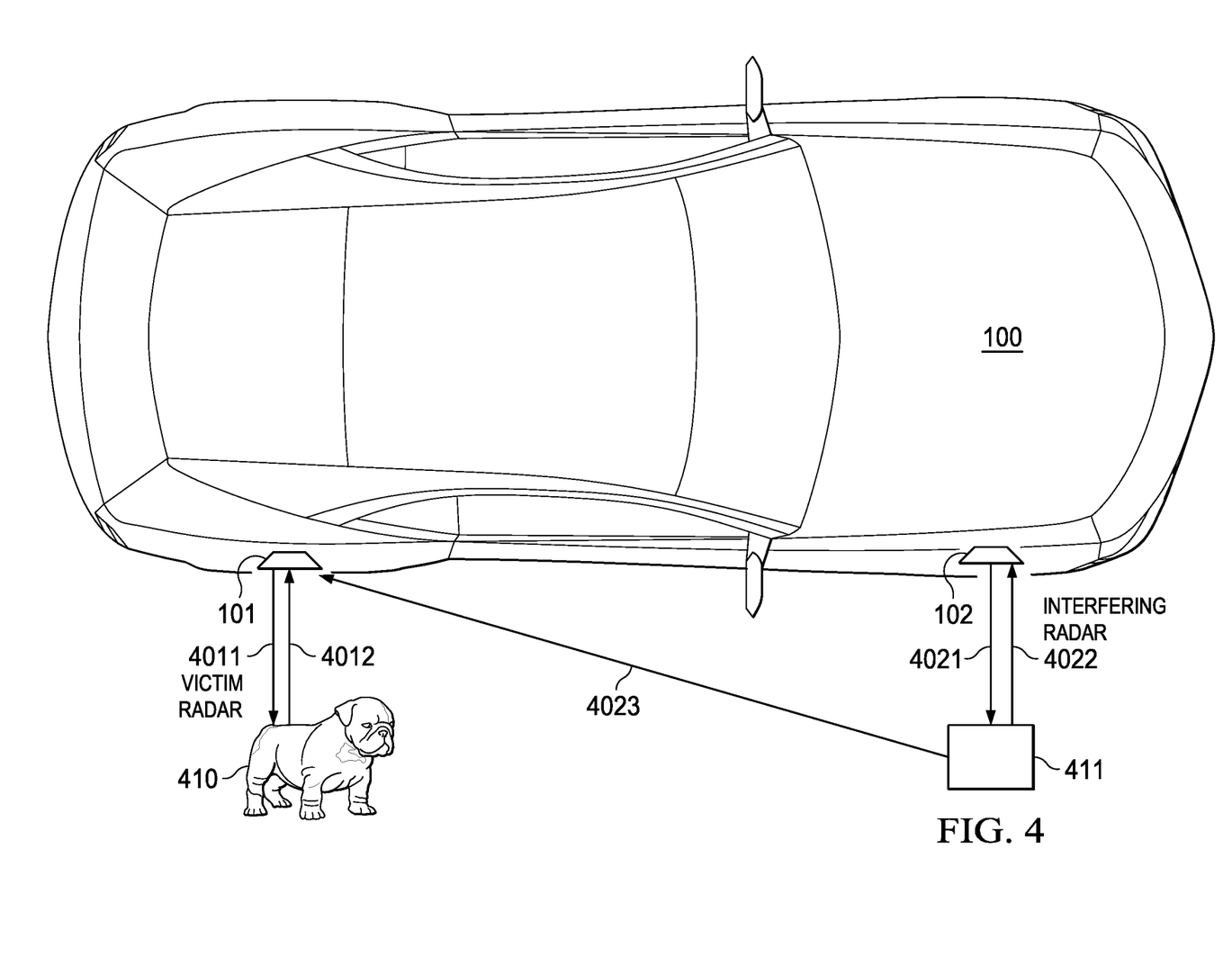
FIG. 4 is a top view of a vehicle illustrating potential interference between radar modules.

FIG. 4 is a top view of vehicle 100 from FIG. 1 illustrating potential interference between radar modules. Interference mitigation requires very deterministic synchronization across radar sensors. Interference mitigation may require radar module synchronization within a couple of microseconds, for example.

In the example illustrated in FIG. 4, a signal 4011 may be transmitted by radar module 101 and produce a reflected signal 4012 that is received by radar module 101. Similarly, a signal 4021 may be transmitted by radar module 102 and produce a reflected signal 4022 that is received by radar module 102. A reflected signal 4023 from object 411 that was originated by radar sensor 102 might fall into the valid signal bandwidth for radar sensor 101 if both radar modules are not synchronized. This interference may cause a misidentification of object 410, or may cause an erroneous identification of a ghost object, for example.

Figure 5:
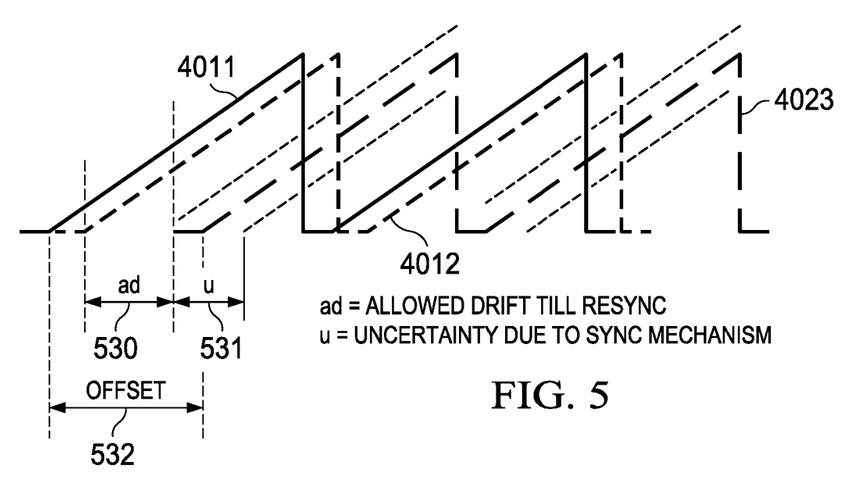
FIG. 5 is a plot illustrating a scheme for avoiding interference between two radar modules.

FIG. 5 is a plot illustrating a scheme for avoiding interference between two radar modules 101, 102 as illustrated in FIG. 4. As described above with regard to FIG. 4, a signal 4011 may be transmitted by radar module 101 and produce a reflected signal 4012 that is received by radar module 101. A reflected signal 4023 from object 411 that was originated by radar sensor 102 might fall into the valid signal bandwidth for radar sensor 101 if both are not synchronized.

As will be described in more detail below, radar modules 101 and 102 are synchronized to have a defined time offset 532 between the start of each of the chirps transmitted by radar modules 101 and 102. In this manner, a reflected signal 4023 from radar module that is received by radar module 401 may be filtered out. Due to a small amount of uncertainty "u" 531 in the exact timing between radar modules 101, 102, the exact time that an interfering signal 4023 may be received by radar module 101 may vary by "u" microseconds 531, where u may be in the range of less than 1 microsecond, for example. "U" represents an uncertainty in synchronization which can be an artifact of different cable lengths to different radar nodes, asynchronous nature of the clock in each node, etc. In addition, since relatively low cost oscillators may be used in each of the radar modules 101, 102, their timing may drift over time. Therefore, by periodically resynchronizing the drift may be limited to an allowable delay amount of time "ad" 530. In order to maintain synchronization, the global synchronization may be retransmitted approximately every 100 milliseconds in this example. In this example, radar modules 101, 102 may be initially synchronized to have an offset time 532 of approximately 5 microseconds, for example.

Figure 6:
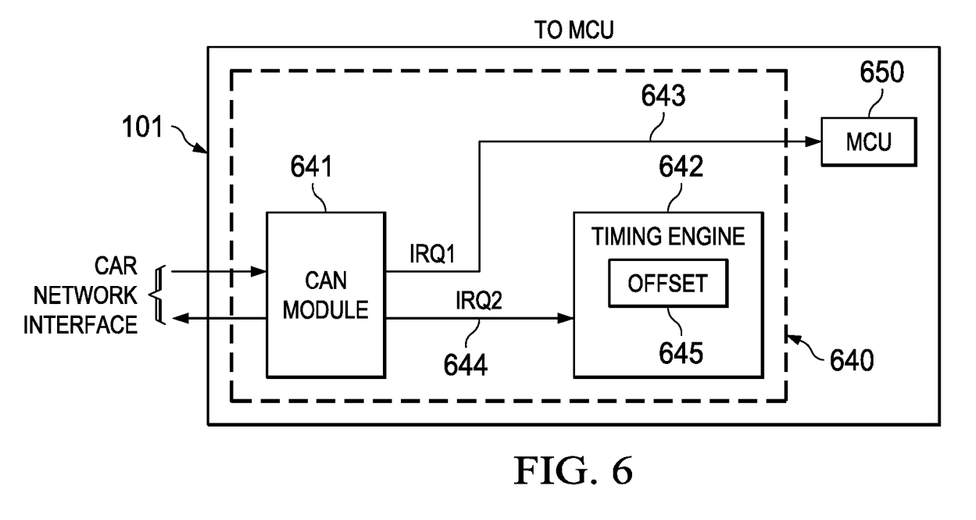
FIG. 6 is a block diagram illustrating use of a CAN interface to synchronize radar modules.

FIG. 6 is a block diagram illustrating use of a CAN interface 640 that may be used to synchronize radar modules, such as radar modules 101-106 in FIG. 1. A synchronization feature is not inherently supported by the CAN Interface as specified in ISO standard 11898. However, the CAN Interface supports a message acceptance filtering mechanism to accept or reject the specific messages based on a configured message ID. Also, a CAN interface module may support multiple Interrupt outputs which can be assigned to specific message IDs. As mentioned earlier, the standard 11-bit identifier field provides for $2^{11}$, or 2048 different message identifiers, whereas the extended 29-bit identifier provides for $2^{29}$, or 537 million identifiers. Thus, a CAN module may be assigned multiple message IDs to allow it to selectively accept various types of messages.

Each radar module 101-106 of FIG. 1 may include a CAN interface 640. As shown in this example that represents radar module 101, CAN interface 640 may include one or more interrupts signals 643 that are response to one or more selected message IDs to provide alerts to a micro-control unit (MCU) 650 that is included within radar module 101, MCU 650 may perform various control functions within radar unit 101, for example. A separate interrupt 644 that is responsive to another message ID may be provided to timing engine 642. A register 645, or other storage circuit such as random access memory (RAM), may be included to hold an offset time value.

As is well known, each message on the CAN bus is treated as a broadcast message and is received by all modules that are connected to the CAN bus. For each message, any module that has a message ID that matches the message ID of the current message will accept the message; all other modules will ignore the message. Therefore, a controller for the radar system, such as CPU 110 in FIG. 1 may send a single message with a message ID that matches the message ID for interrupt signal 644 of several radar modules in order to synchronize those radar modules. This message may be referred to as a "global Sync message." or a "sync message," for example.

During operation, timing engine 642 may be configured to start transmission of a radar frame at a time that is offset from receipt of interrupt 644 by the offset time amount. Thus, one radar module, such as radar module 101 in FIG. 4, may be programmed to have an offset value of 0 microseconds, while radar module 102 in FIG. 4 may be programmed to have an offset value of 5 microseconds, for example. In this manner, the adjacent radar modules 101, 102 will start each frame with an offset of approximately 5 microseconds from each other. This offset in time will then allow each radar module 101, 102 to filter out interfering reflection signals, such as interference signal 4023, referring back to FIG. 4.

Referring back to FIG. 1, since radar modules 104 and 105 are on opposite sides of vehicle 100 from radar module 101, 102, it is unlikely that there will be interference between them and radar modules 104, 105. Therefore, radar modules 104, 105 may use the same offset timing as respective radar modules 101, 102 in order to eliminate interference between radar modules 104, 105. Likewise, front radar module 103 and back radar module 106 are not likely to receive interference from side radar modules 101, 102, 104, 105 so they may not need to be synchronized, or they may be synchronized with an offset value of 0 microseconds, or some other fixed amount.

No additional cabling or interface logic on the device is required to achieve the synchronization across multiple Radar sensor nodes 101-106 and CPU 110. This is a big advantage considering the length of the cable to reach all of the radar modules may be significant. For example, a typical vehicle may require a cable that has a length that is in the order of 10s of meters to reach all of the radar modules.

Figure 7:
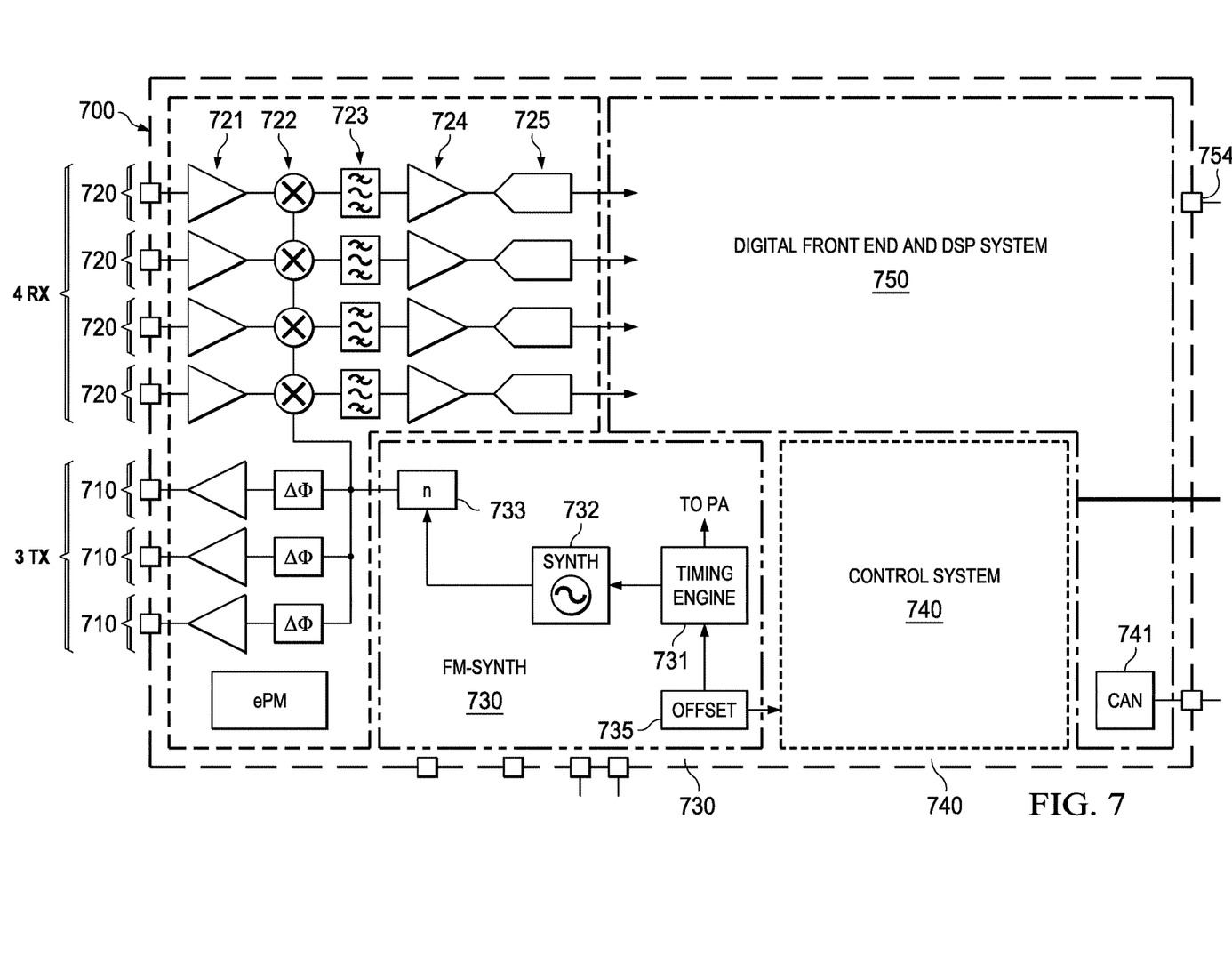
FIG. 7 is a block diagram of an example radar module for use in the vehicle of FIG. 1.

FIG. 7 is a block diagram of an exemplary radar system on a chip (SoC) 700 that may include multiple radar transmitters and receivers. SoC 700 may be representative of any of radar modules 101-106 of FIG. 1. Radar SoC 700 may include multiple transmit channels 710 for transmitting FMCW (frequency modulated continuous wave) RF signals and multiple receive channels 720 for receiving the reflected transmitted signals. Further, the number of receive channels may be larger than the number of transmit channels. For example, an embodiment of the radar SoC 700 may have three transmit channels and four receive channels. Other radar SoC embodiments may have more or fewer transmit and receive channels, for example. In some embodiments, one SoC may include a set of receivers and another SoC may include a set of transmitters, for example.

A transmit channel may include a suitable transmitter and antenna. A receive channel includes a suitable receiver and antenna. Further, each of the receive channels 720 may be identical and include a low-noise amplifier (LNA) 721 with one or more stages to amplify the received signal, a mixer 722 to mix the signal generated by the transmission generation circuitry with the received signal to generate an IF (intermediate frequency) signal, a baseband bandpass filter 723 for filtering the IF signal, a variable gain amplifier (VGA) 724 for amplifying the filtered IF signal, and an analog-to-digital converter (ADC) 725 for converting the analog IF signal to a digital IF signal. The mixer serves as a down converter that generates an output signal with a frequency equal to the difference between the frequency of the inputs received from the low-noise amplifier and the transmission generation circuitry, both of which are radio frequency (RF) signals. The bandpass filter, VGA, and ADC of a receive channel may be collectively referred to as a baseband chain or baseband filter chain. Further, the bandpass filter and VGA may be collectively referred to as an IF amplifier (IFA).

The receive channels 720 are coupled to a digital front end (DFE) and Digital Signal Processor (DSP) system module 750. The DFE 750 includes functionality to perform decimation filtering on the digital IF signals to reduce the data transfer rate. A processor and/or a signal processor in control module 750 may also perform other operations on the digital IF signals, e.g., DC offset removal, digital compensation of non-idealities in the receive channels, such as inter-RX gain imbalance non-ideality, inter-RX phase imbalance non-ideality and the like. The DFE and DSP module 750 may be coupled to a high speed serial interface (I/F) 754 to transfer decimated digital IF signals to a processing unit that may be located in another IC, for example, when the radar SoC 700 is in normal mode. The DFE and DSP system module may also be coupled to the control (CNTL) module 740 to complete the function of the radar module in both functional and test modes and external data communication.

A CAN interface 741 may provide an interface for communication with a processing unit located in another module, such as CPU 110 in FIG. 1. For example, the processing unit may use the CAN 741 to send control information, e.g., timing and frequencies of chirps, output power level, triggering of monitoring functions, etc., to the DFE and DSP System module. The radar SoC 700 may use the CAN 741, for example, to send test data to the processing unit.

The control module 740 and DFE and DSP System module 750 may include functionality to control the operation of the radar SoC 700 in normal mode and in test mode.

The CNTL circuitry 740 may include one or more temperature sensors and various RF/analog measurement components.

A 10 GHz or higher frequency modulation synthesizer (FM-Synth) module 730 generates the RF signals that are then multiplied by four and provided to the transmitter channels. The programmable timing engine 731 includes functionality to receive chirp parameter values for a sequence of chirps in a radar frame from the control module 740 and to generate chirp control signals that control the transmission and reception of the chirps in a frame based on the parameter values. The chirp parameters are defined by the radar system architecture and may include, for example, a transmitter enable parameter for indicating which transmitters to enable, a chirp frequency start value, a chirp frequency slope, a chirp duration, indicators of when the transmit channels should transmit and when the DFE output digital should be collected for further radar processing, etc. One or more of these parameters may be programmable.

Programmable timing engine 731 may also be programmed to insert an offset time value to delay the start of a radar frame in response to a global synchronization message received on the CAN interface 741, as described above with regard to FIG. 6. As described above, an offset value may be stored in a storage circuit 735.

The radio frequency synthesizer (SYNTH) 732 includes functionality to generate FMCW (frequency modulated continuous wave) signals for transmission based on chirp control signals from the timing engine 731. In some embodiments, the SYNTH 732 may include a phase locked loop (APLL) with a voltage controlled oscillator (XO).

The clock multiplier 733 increases the frequency of the transmission signal (LO signal) to the LO frequency of the mixers 722. The clean-up PLL (phase locked loop) operates to increase the frequency of the signal of an external low frequency reference clock (not shown) to the frequency of the SYNTH 732 and to filter the reference clock phase noise out of the clock signal.

The clock multiplier 733, synthesizer 732, timing generator 731, and clean up PLL are an example of transmission generation circuitry. The transmission generation circuitry generates a radio frequency (RF) signal as input to the transmit channels and as input to the mixers in the receive channels via the clock multiplier. The output of the transmission generation circuitry may be referred to as the LO (local oscillator) signal or the FMCW signal.

Figure 8:
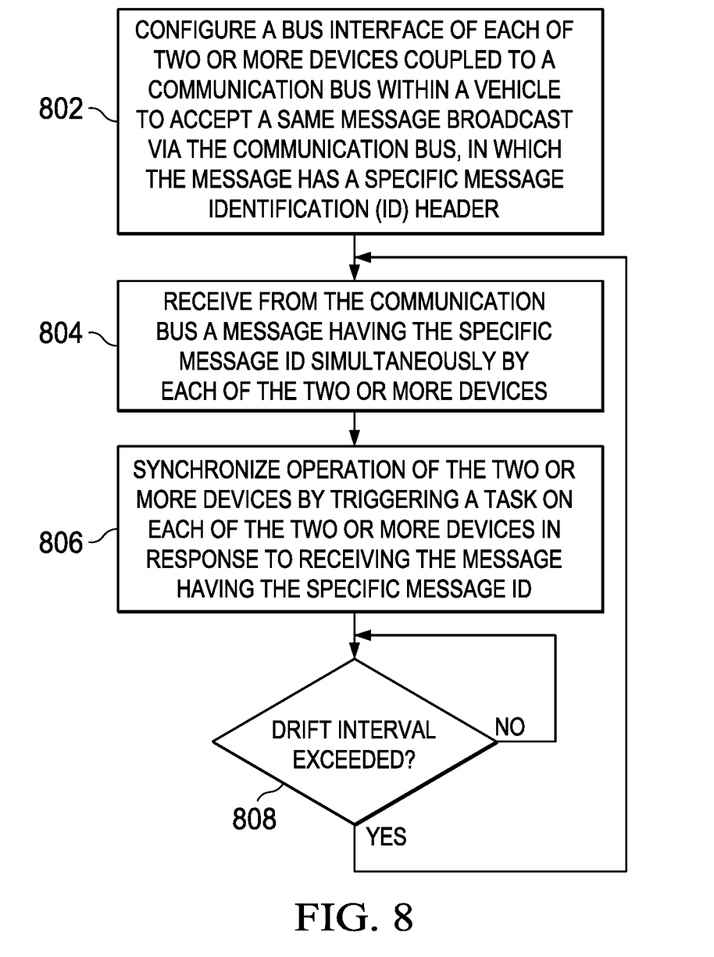
FIG. 8 is a flow chart illustrating a process for synchronizing radar modules using the CAN bus.

FIG. 8 is a flow chart illustrating a process for synchronizing radar modules using the CAN bus. The radar modules may be two or more modules located on a same side of a vehicle in close enough proximity that interference between the two or more radar modules may occur, as described above with regard to FIG. 4, for example.

A bus interface of each of the two or more devices may be coupled to a communication bus within a vehicle and configured at step 802 to accept a same message broadcast via the communication bus. For example, in the CAN embodiment described above, the message may have a specific message identification (ID) header.

A message that has the specific message ID may be received from the communication bus in step 804 simultaneously by each of the two or more devices. The message may be transmitted by a control module that is coupled to the communication bus.

Operation of the two or more devices may be synchronized in step 806 by triggering a task on each of the two or more devices in response to receiving the message having the specific message ID.

Periodically a drift interval may be exceeded in step 808. The drift interval may be defined based on a drift rate of a local oscillator in the two or more devices, for example. The drift interval may be selected so that the two or more devices remain synchronized within a defined range. When the drift interval is exceeded in step 808, step 804 and 806 may be repeated to bring the two or more devices back into close synchronization.

Other Embodiments

While the invention has been described with reference to illustrative embodiments, this description is not intended to be construed in a limiting sense. Various other embodiments of the invention will be apparent to persons skilled in the art upon reference to this description. For example, while a CAN communication bus was described herein, other embodiments may use other types of known or later developed communication buses that allow a broadcast message to be selectively received by specified modules that are coupled to the communication bus.

While synchronization of radar modules was described herein, other embodiments may use the techniques described herein to synchronize the operation of various types of modules, such as actuators, illumination, etc.

While a synchronization of modules within a vehicle was described herein, embodiments of the techniques disclosed herein may be applied to systems such as agricultural equipment, nautical machinery, medical apparatus, semiconductor manufacturing equipment, avionics, machine tools, etc.

While embodiments have been described herein in reference to ADAS, one of ordinary skill in the art will understand embodiments for synchronization of multiple radar modules for applications other than ADAS may benefit from embodiments of the present disclosure, such as, for example, industrial applications, robotics, drones, etc.

While automobiles were discussed above, embodiments of the disclosure are not limited to autos and trucks. Any type of vehicle that may benefit from awareness of nearby objects may benefit from an embodiment of the disclosure. For example, robots, manufacturing and assembly devices, motorcycles, bicycles, etc. may all be regarded as "vehicles" and make use of an embodiment of the disclosure. Similarly, vehicles for movement of a mobility impaired person, such as a wheel chair or scooter, may benefit from an embodiment of the disclosure. Similarly, a "vehicle" to be used by a blind person for walking assistance may also benefit from an embodiment of the disclosure.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for synchronizing radar devices in a vehicle, the method comprising:
   receiving, by a first radar device, over a communication bus, a message comprising an identifier;
   retrieving, from storage, a first offset; and
   based on the identifier, triggering a first data acquisition task at a first time that is offset from receipt of the message by the first radar device by the first offset, wherein the first data acquisition task comprises transmitting, by the first radar device, a first frequency modulated continuous wave (FMCW) chirp.

2. The method of claim 1, wherein the message is received from a control module coupled to the communication bus.

3. The method of claim 1, wherein the communication bus is an International Standards Organization (ISO) 11898 Controller Area Network (CAN) bus.

4. The method of claim 1, further comprising:
   receiving, by a second radar device, the message;
   retrieving, from a second storage, a second offset; and
   based on the identifier, triggering, in the second radar device, a second data acquisition task at a second time that is offset from receipt of the message by the second radar device by the second offset, wherein the second data acquisition task comprises transmitting, by the second radar device, a second FMCW chirp.

5. The method of claim 4, further comprising receiving, by the first radar device and the second radar device, a periodic sequence of messages comprising the identifier; and
   maintaining synchronization between the first radar device and the second radar device based on the periodic sequence of messages.

6. The method of claim 5, further comprising triggering iterations of the first data acquisition task and the second data acquisition task on the first radar device and the second radar device, in response to determining that messages of the periodic sequence of messages comprise the identifier.

7. A radar module, comprising:
   an interface configured to:
      receive a message comprising an identifier on a communication bus; and
      in response to the identifier, assert a synchronization signal;
   a digital front end (DFE); and
   a timing engine coupled to the interface and to the DFE, wherein the timing engine is operable to:
      retrieve an offset from storage; and
      instruct the DFE to transmit a first frequency modulated continuous wave (FMCW) chirp at a time that is offset from receipt of the message by the interface by the offset.

8. The radar module of claim 7, wherein the DFE is configured to receive a reflection of the FMCW chirp.

9. The radar module of claim 7, wherein the communication bus is an International Standards Organization (ISO) 11898 standard Controller Area Network (CAN) bus.

10. A vehicle, comprising:
a communication bus;
a first radar module coupled to the communication bus, the first radar module comprising:
  a first interface configured to:
    receive a message comprising an identifier on the communication bus; and
    assert a first synchronization signal, in response to receiving the message;
  a first digital front end (DFE); and
  a first timing engine coupled to the first interface and to the first DFE, wherein the first timing engine is operable to:
    retrieve, from a first storage, a first offset; and
    instruct the first DFE to transmit a first frequency modulated continuants continuous wave (FMCW) chirp at a first time that is offset from receipt of the first synchronization signal by the first offset; and
a second radar module coupled to the communication bus, the second radar module comprising:
  a second interface configured to:
    receive the message; and
    assert a second synchronization signal, in response to receiving the message;
  a second DFE; and
  a second timing engine coupled to the second interface and to the second DFE, wherein the second timing engine is operable to:
    retrieve, from a second storage, a second offset; and
    instruct the second DFE to transmit a second FMCW chirp at a second time that is offset from receipt of the second synchronization signal by the second offset.

11. The vehicle of claim 10, wherein the communication bus is defined by International Standards Organization (ISO) 11898 Controller Area Network (CAN) bus.

12. The vehicle of claim 10, further comprising a processor module coupled to the communication bus, wherein the processor module is operable to transmit a second message comprising the identifier on the communication bus.

13. The vehicle of claim 12, wherein the processor module is configured to periodically transmit another message comprising the identifier on the communication bus.

14. A method of communicating in a vehicle, the method comprising:
  receiving, by a first radar module and a second radar module, simultaneously from a communication bus, a sync message comprising an identifier;
  retrieving, by the first radar module from a first storage, a first offset;
  initiating, by the first radar module, a first frequency modulated continuous wave (FMCW) chirp, at a first time that is offset from the receiving of the sync message by the first radar module by the first offset;
  retrieving, by the second radar module from a second storage, a second offset; and
  initiating, by the second radar module, a second FMCW chirp, at a second time that is offset from the receiving of the sync message by the second radar module by the second offset.

15. The method of claim 14, wherein the communication bus is defined by International Standards Organization (ISO) 11898 Controller Area Network (CAN) bus.

16. The method of claim 14, further comprising transmitting, by a processor of the first radar module, a third message comprising the identifier on the communication bus.

17. The method of claim 16, further comprising periodically transmitting, by the processor, a follow-up sync message comprising the identifier, on the communication bus.

18. The method of claim 17, further comprising:
  delaying the first radar module by the first offset after receiving each of the follow-up sync messages by the first radar module, then initiating transmission of a sequence of FMCW frames by the first radar module; and
  delaying the second radar module by the second offset after receiving each of the follow-up sync messages by the second radar module, then initiating transmission of a sequence of FMCW frames by the second radar module.

19. The radar module of claim 7, further comprising the storage configured to store the offset.

20. The vehicle of claim 10, wherein the first radar module further comprises the first storage configured to store the first offset and the second radar module further comprises the second storage configured to store the second offset.

* * * * *